(12) United States Patent
Verma et al.

(10) Patent No.: US 7,330,448 B2
(45) Date of Patent: Feb. 12, 2008

(54) TECHNIQUE FOR MANAGING QUALITY OF SERVICES LEVELS WHEN INTERWORKING A WIRELESS LOCAL AREA NETWORK WITH A WIRELESS TELEPHONY NETWORK

(75) Inventors: Shaily Verma, Monmouth Junction, NJ (US); Guillaume Bichot, Princeton, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 1102 days.

(21) Appl. No.: 10/224,911

(22) Filed: Aug. 21, 2002

(65) Prior Publication Data

US 2004/0198365 A1   Oct. 7, 2004

(51) Int. Cl.
*H04Q 7/00* (2006.01)
(52) U.S. Cl. ............... 370/331; 370/338; 370/352; 455/436; 455/442
(58) Field of Classification Search ............... 370/335, 370/353; 455/339, 438
See application file for complete search history.

(56) References Cited

U.S. PATENT DOCUMENTS

| | | | | |
|---|---|---|---|---|
| 4,706,275 | A | 11/1987 | Kamil | 379/144 |
| 6,925,074 | B1* | 8/2005 | Vikberg et al. | 370/338 |
| 7,047,036 | B2* | 5/2006 | Shaheen et al. | 455/552.1 |
| 7,054,945 | B2* | 5/2006 | Hurtta et al. | 709/230 |

FOREIGN PATENT DOCUMENTS

| | | |
|---|---|---|
| EP | 1 178 644 A2 | 2/2002 |
| EP | 1207708 | 5/2002 |
| WO | WO 00/69113 | 11/2000 |
| WO | WO 01/28160 A2 | 4/2001 |
| WO | WO 01/54379 A1 | 7/2001 |

(Continued)

OTHER PUBLICATIONS

Digital cellular telecommunication system (phase 2+); Universal Moible telecommunications system (UMTS); general packet radio service (GPRS) service description; stage 2; (3GPP TS 23.060 ver. 5.2.0 rel. 5), Jun. 2002, ETSI TS 123 060; ETSI; entire document.*

(Continued)

*Primary Examiner*—Doris H. To
*Assistant Examiner*—Ian N. Moore
(74) *Attorney, Agent, or Firm*—Joseph J. Laks; Harvey D. Fried; Robert B. Levy

(57) ABSTRACT

A communications network (10) advantageously provides wireless telephony service to a mobile terminal user (16) from one of a first radio access mechanism (18, 20) of a wireless telephony network (12) and a second radio access mechanism (30, 32) of a wireless Local Area Network (14). The first radio access mechanism provides service at a first quality of service (QoS) level specified in a primary Packet Data Protocol (PDP) context established with the mobile terminal user during which the mobile terminal user is assigned an address for data communication. When the mobile terminal user transitions from the first access node to the second access node, the user receives service in accordance with a secondary PDP context activated by the mobile terminal user. The secondary PDP context specifies the same data address as the primary PDP context but a different QoS level.

18 Claims, 2 Drawing Sheets

FOREIGN PATENT DOCUMENTS

| | | |
|---|---|---|
| WO | WO 01/76134 A1 | 10/2001 |
| WO | WO 02/05520 A2 | 1/2002 |
| WO | WO 02/062094 A2 | 8/2002 |

OTHER PUBLICATIONS

Sophia Antipolia; *3 GPP TS 23.101 v. 4.0.0* (Apr. 2001), Valbonne-France.

Unitech; *Unitech Solutions Introducing Unitech Subscriber Solutions* (May 17, 2002) USA.

Bizwatch; *Gric Offers Prepaid Wireless Service to Network and Corporate Customers Through Mind CTI* (Oct. 29, 2001) USA.

"Digital cellular telecommunications system (Phase 2+) ;Universal Mobile Telecommunications System (UMTS); General Packet Radio Service (GPRS) Service description; Stage 2 (3GPP TS 23.060 Version 5.2.0 Release 5), pp. 18-22, 119-127, 160", ETSI TS 123 060 V5.2.0, Jun. 1, 2002, XP002235158.

\* cited by examiner

TECHNIQUE FOR MANAGING QUALITY OF SERVICES LEVELS WHEN INTERWORKING A WIRELESS LOCAL AREA NETWORK WITH A WIRELESS TELEPHONY NETWORK

TECHNICAL FIELD

This invention relates to a technique for interworking a wireless Local Area Network (LAN) with a wireless telephony network to allow a user to easily transition between networks while taking advantage of the higher quality of service available through the wireless LAN.

BACKGROUND ART

Advances in the field of wireless LAN technology has led to the availability of relatively inexpensive wireless LAN equipment, which, in turn, has resulted in the emergence of publicly accessible wireless LANs (e.g., "hot spots") at rest stops, cafes, libraries and similar public facilities. Presently, wireless LANs offer users the opportunity to access a private data network, such as a Corporate Intranet, or a public data network such as the Internet. Few if any publicly accessible wireless LANs offer any type of telephone service, let alone, wireless telephony service.

Presently, users desirous of obtaining wireless telephony service typically subscribe to one of many providers of such service. Today's wireless telephony service providers not only offer voice-calling capability, but also offer General Packet Radio Service (GPRS), thereby affording subscribers the capability of exchanging data packets via a mobile terminal. While GPRS exists in many areas, data transmission rates typically do not exceed 56 Kbs and the costs incurred by wireless network service providers to support this service remain high, making GPRS expensive.

The relatively low cost to implement and operate a wireless LAN, as well as the available high bandwidth (usually in excess of 10 Megabits/second) makes the wireless LAN an ideal access mechanism through which a mobile terminal user can exchange packets with a wireless telephony network. Indeed many wireless LAN networks offer users a much higher Quality of Service (QoS) level in comparison to the QoS level offered in connection with GPRS. Indeed, even the proposed "Universal Mobile Telecommunications System 3GPP" standard for advanced packet radio service through wireless telephony networks, as is well known in the art, will not afford a QoS level as high as present-day wireless LAN networks.

Most mobile terminal users that access the wireless telephony network through a wireless LAN expect to obtain the higher QoS level available through the wireless LAN. Unfortunately, no mechanism currently exists that allows a mobile terminal user to easily transition between a wireless telephony network and a wireless LAN while affording the user the ability to obtain the higher QoS level in the wireless LAN network. Presently, a mobile terminal initially obtains service from a wireless telephony network by attaching itself to the network via a Packet Data Protocol (PDP) context. To establish a PDP context, the mobile terminal user makes a PDP context request in which the mobile user identifies itself to the wireless telephony network. In the PDP context request, the mobile terminal user typically specifies a QoS level that is available in the wireless telephony network. In response to the PDP context request, the wireless telephony network assigns an Internet Protocol (IP) address to the mobile terminal user to enable the exchange of data packet.

In addition, the wireless network will reserve the resources needed to provide the mobile terminal user with the specified QoS level.

To obtain the higher QoS level available through the wireless LAN, a mobile terminal user could establish a separate PDP context within the wireless LAN. To establish such a PDP context, the mobile terminal user would make a PDP context request specifying a QoS level available in the wireless LAN. After establishing the PDP context within the wireless LAN, the mobile terminal user will receive a new IP address different from the address assigned during with the PDP context established with the wireless telephony network. When the mobile terminal user transitions from the wireless LAN back to the wireless telephony network, the mobile terminal user will need to establish a new PDP context. In practice, the wireless telephony network will not accept the PDP context associated with the wireless LAN. The need for a mobile terminal user to establish a new PDP context upon transitioning from the wireless LAN to the wireless telephony network consumes unnecessary resources.

Thus, there is need for a technique that enables a mobile terminal user to seamlessly transition between the wireless network and the wireless LAN while enabling the mobile terminal user to enjoy the higher QoS level available in the wireless LAN.

BRIEF SUMMARY OF THE INVENTION

Briefly, in accordance with the present principles, one of at least first and second radio access mechanisms, such as a radio access node and associated Radio Network Controller in a wireless network, and an access node and associated Interworking Element in a wireless LAN, respectively, provides wireless telephony service to a mobile terminal user. The first radio access mechanism provides wireless telephony service to the mobile terminal user at a first Quality of Service (QoS) level. In practice, the first QoS level is specified during a primary Packet Data Protocol (PDP) context established between the mobile terminal user and the first radio access mechanism at which time the mobile terminal user receives an assigned address (typically, an IP address) for data communications purposes. When the mobile terminal user transitions from the first radio access mechanism to the second radio second access mechanism (e.g., the access node and associated Interworking Element in the wireless LAN), the second radio access mechanism provides service to the mobile terminal user in accordance with a secondary PDP context activated by the mobile terminal user. Using the secondary PDP context, the mobile terminal user retains the same address for receipt of data as assigned during the primary PDP context. However, the secondary PDP context assigns the mobile terminal user a second QoS level typically higher than the first QoS level.

DETAILED DESCRIPTION

Figure 1:
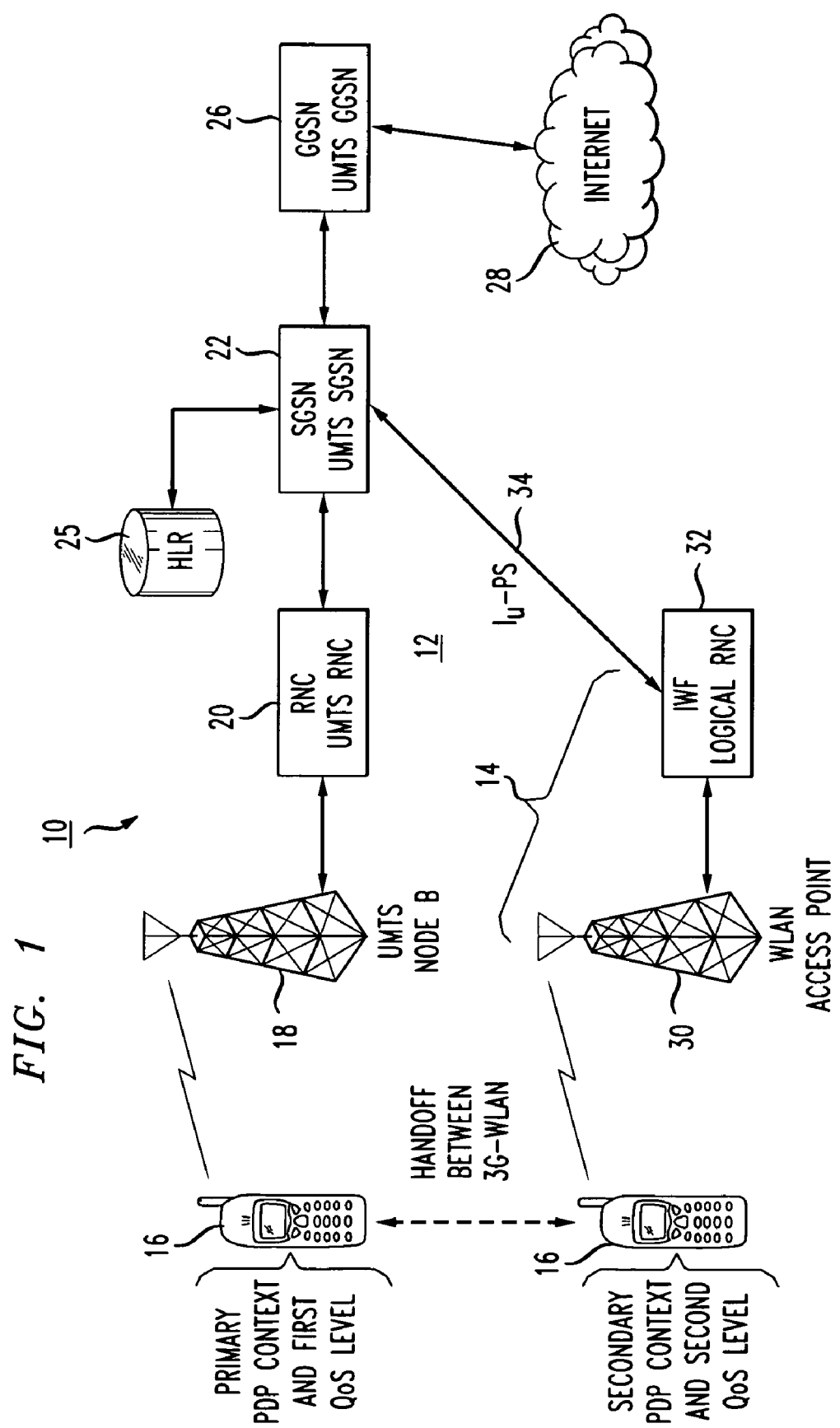
FIG. 1 illustrates a block schematic diagram of a wireless telephony network interworked with a wireless network for practicing the method of the present principles.

FIG. 1 depicts a block schematic of a communications network 10 that includes a wireless telephony network 12 interworked with a wireless LAN 14. In accordance with present principles, a mobile terminal user 16 receives wireless communication service via the wireless telephony network 12 directly, or via the wireless LAN 14 at first and second Quality of Service (QoS) levels, respectively, without having to establish a new Packet Data Protocol (PDP) context when transitioning from one network to another.

In the illustrated embodiment, the wireless network 12 has an architecture in compliance with the UMTS 3GPP standard well known in the art. To that end, the wireless telephony network 12 includes at least one radio node 18 in the form of a Universal Mobile Telephone System (UMTS) Node B, for providing radio access within a particular geographic area to the mobile terminal user 16, as well as other mobile terminal users (not shown). While FIG. 1 illustrates only one radio node 18, the wireless network 12 typically contains a plurality of such nodes managed by at least one Radio Network Controller (RNC) 20. Indeed, the wireless network 12 could include a plurality of RNCs, each RNC 20 managing a group of radio nodes 18.

Within the wireless telephony network 12, each RNC, such as RNC 20 interfaces with an associated Serving GPRS Service Node (SGSN) 22. While FIG. 1 illustrates a single SGSN 22, the wireless telephony network 12 can include a plurality of SGSNs, each associated with one or more RNCs 20. Each SGSN, such as SGSN 22, identifies and authenticates each mobile terminal user, such as user 16, seeking service on a corresponding radio node, such as radio node 18 managed by its associated RNC 20.

The SGSN 22 interfaces with a Home Location Register (HLR) 25. The HLR 25 takes the form of a database that stores information about each mobile terminal user, such as mobile terminal user 16, that subscribes to packet radio service, such as General Packet Radio Service (GPRS), provided by the wireless telephony network 12. In particular, the HLR 25 stores the IP address assigned to each mobile terminal user when the user attaches itself to the wireless network as well as the identity of the corresponding SGSN 22 currently serving that mobile terminal user.

Within the wireless telephony network 12, a Gateway GPRS Support Node (GGSN) 26 provides an interface between each SGSN, such as SGSN 22, and an external data network such as the Internet 28. As discussed in greater detail below, the GGSN 26 provides each mobile terminal user 16 with a dynamic IP address upon attachment of the mobile terminal user with the wireless network 12. The dynamic IP address assigned to each mobile terminal user 16 allows each SGSN 22 to route packets to and from the mobile terminal user(s) 16 served by that SGSN. In addition, the GGSN 26 reserves the necessary resources to allow for access to the Internet 28 by each mobile terminal user 16 as required.

The wireless LAN 14 within the communications network 10 includes a wireless LAN access point 30 that has a transceiver (not shown) for exchanging radio frequency signals with the mobile terminal user 16 when the user accesses the wireless LAN. While FIG. 1 depicts the wireless LAN 14 as having the single access point 30, a typical wireless LAN could include a plurality of such access points. Each wireless LAN access point, such as access point 30, has a link to an Interworking Element (IWE) 32 connected to the SGSN 22 in the wireless telephony network 12 via a dedicated communications link 34. The IWE 32 interworks the mobile terminal user 16 with the SGSN 22 in a manner equivalent to the manner in which each RNC 20 interworks the mobile terminal user 16 with the SGSN.

Figure 2:
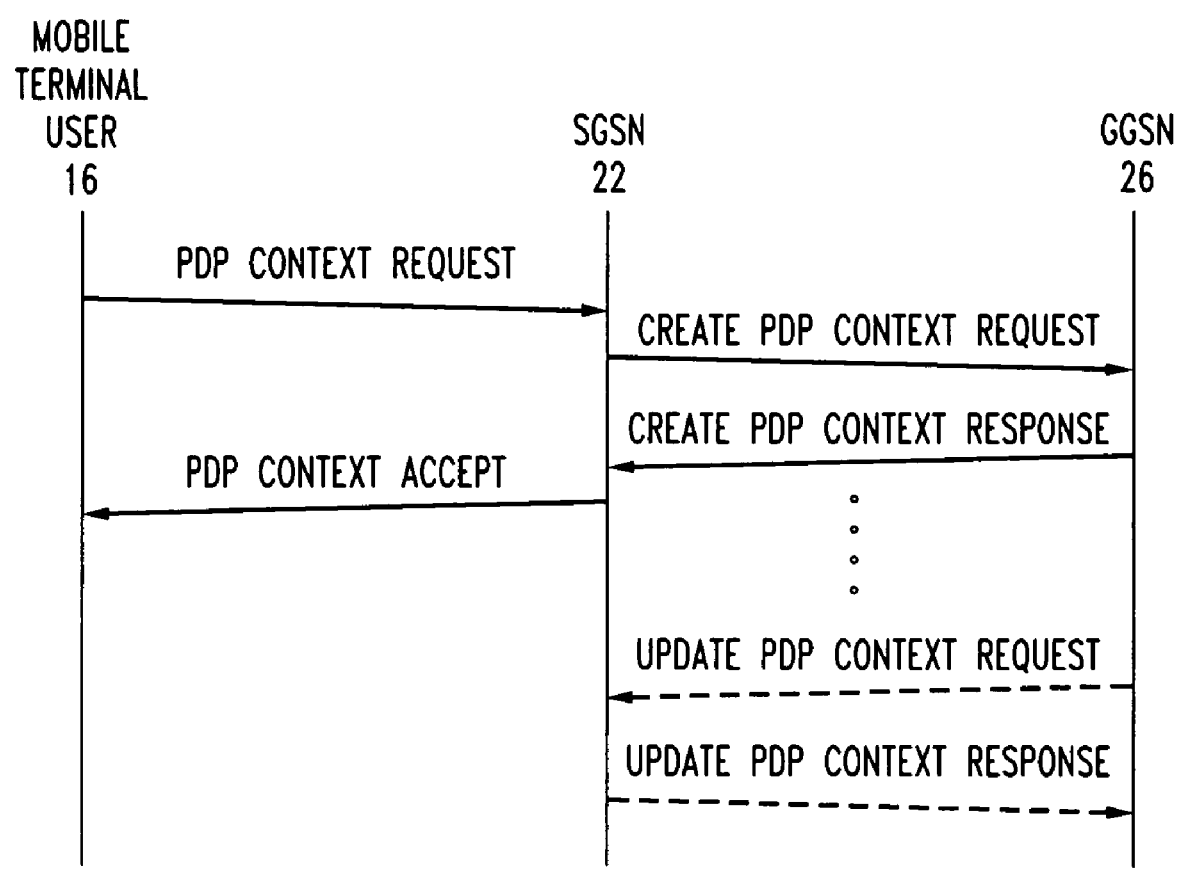
FIG. 2 depicts the signals exchange occurring among elements in the wireless network of FIG. 1 during establishment of a Packet Data Protocol (PDP) context.

FIG. 2 depicts the exchange of signals among the mobile terminal user 16, the SGSN 22 and the GGSN 26 in connection with the attachment of the mobile terminal user to the wireless network 12. To attach itself to the wireless telephony network 12, the mobile terminal user 16 first initiates communication with a radio access node, such as radio access node 18 of FIG. 1. After initiating communications with the radio access node 18, the mobile terminal user 16 then makes a PDP context request that contains the user's identity as well as a specified a QoS level commensurate with the capability of the wireless telephony network 12. The PDP request passes to the RNC 20 (FIG. 1) managing the radio access node 18 in communication with the mobile terminal user 16. In turn, the RNC 20 forwards the PDP context request to the SGSN 22. Upon receipt of the PDP context request, the SGSN 22 identifies and authenticates the requesting mobile terminal user 16 and reserves the needed resources to provide service at the specified QoS level. Both the mobile terminal user 16 and the SGSN 22 have a Service Management (SM) layer within their respective protocol stacks (not shown) that manages the establishment of the PDP context.

The SGSN 22 then forwards the PDP context request to the GGSN 26. Upon receipt of the PDP context request, the GGSN 26 assigns a dynamic IP address to the requesting mobile terminal user 16 as part of the PDP context response. To the extent that the mobile terminal user seeks access to the Internet 28, the GGSN 36 will reserve the necessary resources and perform any needed authentication. If the mobile terminal user 16 has a static IP address, the PDP context request made by the mobile terminal user will incorporate that information. Otherwise, the IP static address field remains empty. Once having obtained a dynamic IP address in this fashion, the mobile terminal user 16 retains that address as long as the user remains in radio communication with the wireless telephony network 12.

Each address assigned in connection with a PDP context (hereinafter referred to as a "PDP" address) can have a different quality of service (QoS) profile requested by the mobile terminal user. For example, applications such as Electronic mail (E-Mail) can tolerate lengthy response times and for PDP addresses associated with E-mail, the mobile terminal user 16 can request a lower QoS level. Other applications cannot tolerate delay and demand a very high level of throughput, and hence a high QoS level. Interactive applications constitute one such example. These different requirements are reflected in the QoS profile associated with the different PDP addresses.

Presently, a mobile terminal user, such as mobile terminal user 16, seeking access to the wireless LAN 14 will establish a separate PDP context with the wireless LAN to take advantage of the higher QoS that is available in that network. Unfortunately, at the present time, wireless telephony networks, such as network 12 of FIG. 1, do not accept the PDP context established by the mobile terminal user with the wireless LAN 14 of FIG. 1. In practice, the wireless telephony network 12 cannot support the higher QoS level typically specified by the mobile terminal user 16 in its wireless LAN PDP context request. Thus, a mobile terminal user 16, upon re-establishing a direct communications session with the wireless telephony network 12, will need to create a new PDP context that takes account of the reduced QoS level in the wireless network.

At the present time, the mobile terminal user 16 receives a new IP address upon establishing a PDP context with the wireless telephony 12 when transitioning from the wireless LAN network 14 to a direct connection with the wireless telephony network. Such a new IP address assignment requires that the wireless telephony network 12 update the HLR 25 and each SGSN 22 to assure proper routing of packets to and from the mobile terminal user 16. While such updates typically occur without incident, errors can occur. Reducing the need to make such updates will reduce the possibility of error.

In accordance with the present principles, a mobile terminal user, such as mobile terminal user 16, can readily transition between a direct connection with the wireless telephony network 12, and a connection via the wireless LAN 14, without the need to obtain a new IP address, upon accessing each network. Rather, upon transitioning from the wireless telephony network 12 to the wireless LAN 14, the mobile terminal user 16 can modify the original (hereinafter, the "primary) PDP context by activating a Secondary PDP context to take advantage of the higher QoS level of the wireless LAN, while retaining the originally assigned IP address. In practice, the mobile terminal user 16 will initially establish the secondary PDP context in the same manner in which the primary PDP context is established as described with respect to FIG. 2.

The Secondary PDP Context Activation procedure can be used to activate a PDP context while reusing the PDP address and other PDP context information from an already active PDP context (such as the a primary PDP context), but with a different QoS profile. The Secondary PDP Context is always associated with a Traffic Flow Template (TFT). The TFT contains attributes that specify an IP header filter that directs data packets received from the interconnected external packet data network to the network (e.g., the wireless LAN 14) associated with the newly activated PDP context. The TFT is sent transparently via the SGSN 22 to the GGSN 26 upon activation of the secondary PDP context to enable packet classification and policing for downlink data transfer. A TFT comprises between one and up to eight packet filters, each identified by a unique packet filter identifier.

The QoS parameters in the secondary PDP context are different from the QoS parameters in the primary PDP context created during attachment of the mobile terminal user 16 to the wireless telephony network 12. In practice, the wireless LAN 14 has higher data rate channels, thus affording a higher QoS level. Hence utilizing the primary PDP context during attachment of the mobile terminal user to the 16 to the wireless LAN 14 will preclude certain high-data-rate wireless LAN services. For this reason, a different (i.e., higher) QoS level specification in the Secondary PDP context is desirable.

To better appreciate the technique of the present principles, the process by which the mobile terminal user transitions from the wireless telephony network 12 to the wireless LAN 14 will first be described. Thereafter, the process by which the mobile terminal user transitions from the wireless LAN 14 to the wireless telephony network 12 is described.

Transition from the Wireless Network 12 to the Wireless LAN 14

A mobile terminal user 16 entering the coverage area of the wireless LAN 14 will likely want to continue an ongoing data session previously initiated with the wireless telephony network 12. To effect a continuing data session, the RNC 20 that had heretofore served the mobile terminal user 16 (hereinafter referred to as the "serving RNC" or "SRNC") will forward subsequently received data to the IWE 32 via the SGSN 22 over an Iu/Iur interface to avoid packet loss. Simultaneously, an Iu connection is established between the IWE 32 and the SGSN 22 in the same manner that a new RNC establishes such a connection during RNC relocation in accordance with current day relocation procedures.

In accordance with the present principles, the mobile terminal user 16 will keep the primary PDP previously established during the attachment with the wireless telephony network 12, even when the mobile terminal user now attaches itself to the wireless LAN 14. Upon accessing the wireless LAN 14, the mobile terminal user 16 will activate a secondary PDP context for an ongoing session in order to utilize the high data rate in the wireless LAN 14. The mobile terminal user 16 activates the secondary PDP context regardless of whether the IWE 32 in the wireless LAN 14 links to the same SGSN 22 previously serving the RNC 20 that heretofore provided service, or links to a different SGSN.

Upon activation of the secondary PDP context, the TFT will have its relevant packet filters set to enable downlink data transfer (i.e., transfer of data from the RNC 20 to the IWE 32.) In particular, the TFT of the Secondary PDP allows downlink packets with the source IP address and source port number associated with the mobile terminal user 16.

Instead of continuing an existing session, the mobile terminal user 16 could start a new data session with a higher bit rate upon entering the wireless LAN 14. To that end, the mobile terminal user 16 would establish a secondary PDP context to retain the same IP address already active in the primary PDP context. Preserving the primary PDP context established in the wireless telephony domain makes transitioning back to the wireless telephony network 12 easier. During establishment of the secondary PDP context, the TFT sets the relevant packet filters to enable downlink data transfer as discussed previously. In case of no existing primary PDP context, the mobile terminal user follows existing procedures to establish a new primary PDP context.

Transition from the Wireless LAN 14 to Wireless Telephony Network 12

Upon exiting the coverage area of the wireless LAN 14 and re-entering the coverage area within the mobile telephony network 12, the mobile terminal user 16 could choose to continue an ongoing data session. To continue an existing data session, the IWE 32 in the wireless LAN 14 will forward data to the SRNC 20 now serving the mobile terminal user 16. To that end, the IWE 32 forwards the data the SGSN 22 over an Iu/Iur interface to avoid packet loss while an Iu connection between the SRNC 20 and the SGSN is established as in accordance with standard procedures. Upon detecting movement of the mobile terminal user 16 out of the wireless LAN 14 coverage area, the SGSN 22 will delete any Secondary PDP contexts previously established in the wireless LAN 14 and commence using the primary PDP context established previously.

Rather than continue an existing data session, the mobile terminal user 16 could start a new data session upon entering the wireless telephony network 12. When starting a new data session, the mobile terminal user will use the primary PDP context established previously. Should no primary PDP context exist, the mobile terminal user 16 then utilizes standard procedures to establish a primary PDP context. If the new session uses the same source IP address (or identical TFT filter) as for the secondary PDP context, then the secondary PDP context must be destroyed immediately in order to use the primary PDP context for data transfer.

The foregoing describes a technique for enabling a mobile telephone user to transition between a mobile telephone network and a wireless LAN so as to enjoy the higher QoS attributes of the wireless LAN without the need to establish a new PDP context upon establishing a communication session with each network.

The invention claimed is:

1. A method for providing wireless telephony service to a mobile terminal user from one of at least first and second radio access mechanisms, comprising the steps of:
   providing service to the mobile terminal user from the first radio access mechanism at a first quality of service (QoS) level specified in a primary Packet Data Protocol (PDP) context established with the mobile terminal user during which the mobile terminal user receives an address for data communication; and
   upon transition of the mobile terminal user from the first radio access mechanism to the second radio access mechanism, providing wireless service to the mobile terminal user from the second radio access mechanism in accordance with a secondary PDP context activated by the mobile terminal user, the secondary PDP context specifying a second QoS level but using the same address as in the first PDP context.

2. The method according to claim 1 comprising the step of establishing the primary PDP context user when the mobile terminal user seeks initial access to the first radio access mechanism.

3. The method according to claim 2 comprising the step of establishing the secondary PDP context when the mobile terminal user seeks initial access to the second radio access mechanism.

4. The method according to claim 1 further including the step of:
   upon transitioning of the mobile terminal user from the second radio access mechanism to the first radio access mechanism, providing service to the mobile terminal user at the first quality of service (QoS) level specified in the primary PDP context.

5. The method according to claim 4 further including the step of destroying the secondary PDP context.

6. The method according to claim 2 wherein the primary PDP context is established by the steps of:
   receiving a primary PDP context request from the user;
   creating a primary PDP context response that: (1) assigns the mobile terminal user the address for data communications, and (2) reserves resources sufficient to provide service to the user at the first QoS level; and
   forwarding the primary PDP context response to the mobile terminal user.

7. The method according to claim 6 wherein the secondary PDP context is established by the steps of:
   receiving a secondary PDP context request from the user;
   creating a secondary PDP context response that: (1) assigns the mobile terminal user the same address for data communications as assigned during the primary PDP context, and (2) reserves resources sufficient to provide service to the user at the second QoS level; and
   forwarding the secondary PDP context response to the mobile terminal user.

8. A communications network for providing wireless telephony service to a mobile telephone user, comprising:
   a first radio access mechanism for providing service to the mobile terminal user at a first quality of service (QoS) level specified in a primary Packet Data Protocol (PDP) context established with the mobile terminal user during which the mobile terminal user is assigned an address for data communication;
   a second radio access mechanism for providing service to the mobile terminal user upon transition of the mobile terminal user from the first radio access mechanism, the second radio access mechanism providing service in accordance with a secondary PDP context activated by the mobile terminal user, the secondary PDP context specifying a second QoS level but using the same address as for the first radio access mechanism; and
   a core structure for managing the first and second radio access mechanisms.

9. The network according to claim 8 wherein the first radio access mechanism comprises;
   a Universal Mobile Telephone System (UMTS) radio node; and
   a Radio Network Controller for controlling the radio node.

10. The network according to claim 8 wherein the second radio access mechanisms comprises:
    a wireless Local Area Network (LAN) access point; and
    an interworking element for coupling the wireless LAN access point to the core structure.

11. The network according to claim 8 wherein the core structure comprises a Serving General Packet Radio Service Support Node (SGSN) for reserving radio resources for each of the first and second radio access mechanisms in accordance with the first and second QoS levels, respectively.

12. The network according to claim 8 wherein the core structure further comprises a Gateway General Packet Radio Service Support Node (GGSN) for linking each of the first and second radio access mechanisms to an external data network and for assigning the address far data communication during the primary and secondary PDP contexts.

13. A communications network for providing wireless telephony service to a mobile telephone user, comprising:
    a first radio access mechanism for providing service to the mobile terminal user at a first quality of service (QoS) level specified in a primary Packet Data Protocol (PDP) context established with the mobile terminal user during which the mobile terminal user is assigned an address for data communication;
    a second radio access mechanism for providing service to the mobile terminal user upon transition of the mobile terminal user from the first radio access mechanism, the second radio access mechanism providing service in accordance with a secondary PDP context activated by the mobile terminal user, the secondary PDP context specifying a second QoS level but using the same address;
    a Serving General Packet Radio Service Support Node (SGSN) coupled to the first and second radio access mechanisms for reserving radio resources for each of the first and second radio access mechanisms in accordance with the first and second QoS levels, respectively; and
    a Gateway General Packet Radio Service Support node coupled to the SGSN for linking each of the first and second radio access mechanisms to an external data network and for assigning the address for data communication during the primary and secondary PDP contexts.

14. The network according to claim 13 wherein the first radio access mechanism comprises;
    a Universal Mobile Telephone System (UMTS) radio Node; and a Radio Network Controller for controlling the radio node.

15. The network according to claim 13 wherein the second radio access mechanism comprises:
   a wireless Local Area Network (LAN) access point; and
   an interworking element for coupling the wireless LAN access point to the core structure.

16. The method according to claim 2, wherein the secondary PDP context is activated to take advantage of a higher value for the second QoS level with respect to the first QoS level.

17. The network according to claim 8, wherein the secondary PDP context is activated to take advantage of a higher value for the second QoS level with respect to the first QoS level.

18. The network according to claim 13, wherein the secondary PDP context is activated to take advantage of a higher value for the second QoS level with respect to the first QoS level.

* * * * *